US006291557B1

(12) United States Patent
Yamamoto et al.

(10) Patent No.: US 6,291,557 B1
(45) Date of Patent: Sep. 18, 2001

(54) ALKALI-SOLUBLE ADHESIVE AGENT

(75) Inventors: Kyoichi Yamamoto; Kojun Utaka; Hisashi Takada; Akira Iwasaki, all of Yokohama (JP)

(73) Assignee: The Inctec Inc., Kanagawa (JP)

( * ) Notice: Subject to any disclaimer, the term of this patent is extended or adjusted under 35 U.S.C. 154(b) by 0 days.

(21) Appl. No.: 09/695,975

(22) Filed: Oct. 26, 2000

(30) Foreign Application Priority Data

Oct. 26, 1999 (JP) .................................................. 11-304154

(51) Int. Cl.[7] ...................................................... C08K 3/10
(52) U.S. Cl. ............................ 523/458; 525/448; 525/533; 528/100; 528/112; 528/418
(58) Field of Search ............................ 523/458; 525/448, 525/533; 528/100, 112, 418

(56) References Cited

FOREIGN PATENT DOCUMENTS

07331216 * 12/1995 (JP) .

* cited by examiner

Primary Examiner—Robert Dawson
Assistant Examiner—D. Aylward
(74) Attorney, Agent, or Firm—Sughrue, Mion, Zinn, Macpeak & Seas, PLLC

(57) ABSTRACT

The invention provides an alkali-soluble adhesive agent characterized by comprising an alkali-soluble resin that is a reaction product (C) obtained by allowing a polycarboxylic acid and/or a polycarboxylic anhydride having two or more carboxyl groups to react with a reaction product of a compound (A) having at least one epoxy group with a monocarboxylic acid compound (B). Preferably, the alkali-soluble resin is used in combination with a ketone organic solvent, optionally with at least one member selected from the group consisting of a melt viscosity reducing agent, a surface active agent and a plasticizer. The alkali-soluble adhesive agent can be removed by an alkali aqueous solution without recourse to any organic solvent, and is of an environmental protection-conscious type with improvements in adhesion, adhesion strength, coatability, surface smoothness, softening point controllability, melt viscosity controllability and spread controllability.

8 Claims, No Drawings

ALKALI-SOLUBLE ADHESIVE AGENT

BACKGROUND OF THE INVENTION

The present invention relates to an alkali-soluble adhesive agent which is used for temporarily bonding and fixing a substrate such as a wafer or glass substrate to a polishing turn table in processes of fabricating electronic parts for semiconductor integrated circuits, etc. or wafers for solar cells, lens polishing processes, glass polishing processes for making glasses for liquid crystal substrates flat, etc.

Wafers comprising silicon, gallium-arsenide, etc., which are used for the production of electronic parts for semiconductor integrated circuits, etc. or solar cells are fabricated by slicing an ingot comprising a wafer-constituting material to a thin sheet and, then, polishing the thus sliced thin sheet.

For the fabrication of quartz oscillators, lenses, etc. as well as for the glasses required to be flattened, e.g., glasses for liquid crystal substrates, too, cutting and polishing processes are needed. In the processes of polishing such wafers or lenses, rock crystals, glasses, etc., various resins are used as the adhesive agents for fixing the wafers or the lenses, rock crystals, or glasses to a polishing turn table made up of alumina ceramics, etc.

In this case, the wafers or the rock crystals, lenses or glasses are heated and compressed at a temperature of about 110° C. to a turn table, using an adhesive agent. The wafers or the lenses, rock crystals or glasses fixed to the polishing turn table are mirror polished by polishing cloth using a polishing solution. After the completion of polishing, the wafers or the lenses, rock crystals or glasses are cooled down to room temperature or lower, and then released from the turn table by use of a sharp scraper, etc. to remove a portion of the adhesive agent deposited onto the wafers by washing with alkalis or solvents.

Known so far for the adhesive agents used in the processes of polishing lenses, rock crystals, glasses, etc. are glycol phthalate waxes, epoxy waxes, and ketone waxes (JP-A's 61-16477 and 63-27576). After polishing, such adhesive agents are removed by washing with combustible solvents such as a halogen organic solvent, and an aromatic hydrocarbon organic solvent. However, such solvents pose big problems in view of environmental protection; for instance, they cause air pollution and destruction of natural environments. The use of the combustible solvent offers a plant investment problem because it is required to provide explosionproof systems for the purpose of disaster prevention.

To address the fast tempos of cost reductions and technological innovation in the semiconductor industry, high integration-oriented techniques are now under development; for instance, it is required to increase the diameter of silicon wafers from 200 mm$\phi$ to 300 mm$\phi$ from the standpoint of cost reductions, decrease the fineness of patterns from 0.25 $\mu$m to 0.18 $\mu$m from the standpoint of fine patterning, and increase packing densities from 16 Mbits to 64 Mbits from the standpoint of high densities.

Such finer semiconductor devices cause various contamination sources (particles, metal ions, corrosive ions, organic matters, oxide films, etc.) to have a significant influence on the reliability and fabricating yield of semiconductors. Among others, deterioration in device performance due to contamination with metal ions leads to a pn junction leakage problem, and deterioration in device performance due to corrosive ions is of significance as well. For temporal adhesive agents for silicon wafers, too, it is thus required to reduce the contents of metal ions and corrosive ions and thereby have ever higher purity.

Applicant have already filed patent applications (Japanese Patent Application Nos. 11-304154 and 9-286967) for alkali-soluble adhesive agents obtained by adding a mono- or di-valent alcohol to a bisphenol A type epoxy resin, and a novolak type epoxy resin to form a hydroxyl group, and then allowing the resulting product to react with a carboxylic anhydride. However, the former has the demerit of being likely to decrease in softening point although it is excellent in the surface smoothness demanded for a temporal adhesive agent, whereas the latter has the demerit of being likely to increase in softening point and be poor in surface smoothness as well. Thus, there is still growing demand for an alkali-soluble adhesive agent that can be provided in the form of a ever better temporal adhesive agent.

It is thus a primary object of the present invention to provide an alkali-soluble adhesive agent comprising an alkali-soluble resin having a carboxyl group in its molecule and capable of being removed by an alkali aqueous solution without recourse to any organic solvent, which adhesive agent is of an environmental protection-conscious type and improved in adhesion, adhesion strength, coatability, surface smoothness, softening point controllability, melt viscosity controllability and spread controllability.

SUMMARY OF THE INVENTION

As a result of intensive studies made to accomplish the aforesaid object, the inventors have now found that an alkali-soluble adhesive agent—which can provide an adhesive layer having proper adhesion force and releasability and improved in terms of water resistance, ability to be washed with alkalis, etc.—can be obtained by adding some contrivance to the makeup of resins used for alkali-soluble adhesives, and so have accomplished the present invention.

According to one aspect of the present invention, there is provided an alkali-soluble adhesive agent characterized by comprising an alkali-soluble resin that is a reaction product (C) obtained by allowing a polycarboxylic acid and/or a polycarboxylic anhydride having two or more carboxyl groups to react with a reaction product of a compound (A) having at least one epoxy group with a monocarboxylic acid compound (B).

According to another aspect of the present invention, there is provided an alkali-soluble adhesive agent characterized by comprising an alkali-soluble resin that is a reaction product (C) obtained by allowing a polycarboxylic acid and/or a polycarboxylic anhydride having two or more carboxyl groups to react with a reaction product of a compound (A) having at least one epoxy group with a monocarboxylic acid compound (B), and a ketone organic solvent.

According to yet another aspect of the present invention, there is provided an alkali-soluble adhesive agent characterized by comprising an alkali-soluble resin that is a reaction product (C) obtained by allowing a polycarboxylic acid and/or a polycarboxylic anhydride having two or more carboxyl groups to react with a reaction product of a compound (A) having at least one epoxy group with a monocarboxylic acid compound (B), and a ketone organic solvent, optionally with at least one member selected from the group consisting of a melt viscosity reducing agent, a surface active agent and a plasticizer.

According to a further aspect of the present invention, the alkali-soluble adhesive agent is characterized in that the alkali-soluble resin has a softening point of 40 to 130° C. and an acid number of 50 to 200 mgKOH/g.

According to a further aspect of the present invention, the alkali-soluble adhesive agent is characterized in that the compound (A) having at least one epoxy group is an epoxy resin represented by the following general formulae (1) and/or (2):

General Formula (1)

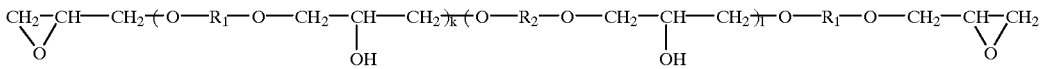

wherein —O—$R_1$—O— and —O—$R_2$—O— are each a divalent phenol residue and k is 1 or an integer equal to or greater than 0, and/or General Formula (2)

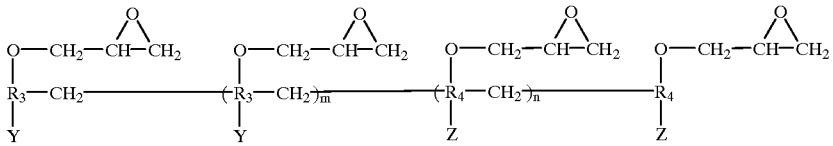

wherein —O—$R_3$— and —O—$R_4$—, which may be different from or identical with each other, are each a monovalent phenol residue, Y and Z, which may be different from or identical with each other, are each a hydrogen atom, a halogen atom, a glycidyl ether group, an alkyl group, an allyl group or an aralkyl group, provided that said alkyl group, allyl group and aralkyl group may have a glycidyl substituent, and m and n are each an integer equal to or greater than 0).

According to a further aspect of the present invention, the alkali-soluble adhesive agent is characterized in that the weight mixing ratio of the epoxy resin represented by general formula (1) and the epoxy resin represented by general formula (2) is from 90:10 to 50:50.

According to a further aspect of the present invention, the alkali-soluble adhesive agent is characterized in that 0 to 40 parts by weight of a rosin resin having an acid number of 70 mgKOH/g or greater are added to 100 parts by weight of the alkali-soluble resin.

According to a further aspect of the present invention, the alkali-soluble adhesive agent is characterized by containing one metal selected from the group consisting of K, Ca, Mg, Al, Ni, Sn, Zn, Cu, Fe, Cr and Pb at a content of 50 ppb or less.

The alkali-soluble adhesive agent of the present invention comprises an alkali-soluble resin having a carboxyl group in its molecule and capable of being removed by an alkali aqueous solution without recourse to any organic solvent, and is of an environmental protection-conscious type with improvements in adhesion, adhesion strength, coatability, surface smoothness, softening point controllability, melt viscosity controllability and spread controllability.

DESCRIPTION OF THE PREFERRED EMBODIMENTS

The alkali-soluble adhesive agent of the present invention is characterized by comprising an alkali-soluble resin. This resin may be used in combination with a ketone organic solvent and preferably with at least one member selected from the group consisting of a melt viscosity reducing agent, a surface active agent and a plasticizer. If required, the resin may be used in combination with a rosin resin.

The alkali-soluble resin (hereinafter often referred to as compound (C)) is obtained by steps of:

(1) adding a monocarboxylic acid compound (B) to an epoxy group of a compound (A) having at least one epoxy group for hydroxyl group formation, thereby obtaining a hydroxyl group-containing resin, and then (2) allowing a polycarboxylic acid and/or a polycarboxylic anhydride having two or more carboxyl groups to react with the thus formed hydroxyl group. This resin is a polycarboxylic acid resin having a softening point of 40 to 130° C., preferably 60 to 90° C. and an acid number of 50 to 200 mgKOH/g, preferably 70 to 130 mgKOH/g.

When the softening point is lower than 40° C., it is difficult to release the adhesive agent from a wafer at room temperature. When the softening point exceeds 130° C., a problem arises; the adhesion force between the member to be bonded and the polishing turn table becomes low. At an acid number below 50 mgKOH/g, the solubility of the adhesive agent in an alkaline solution upon washing becomes low. At an acid number exceeding 200 mgKOH/g, a problem arises in connection with water resistance; the water resistance of the adhesive agent becomes low.

For the compound (A) used herein and having at least one epoxy group, bisphenol A type epoxy resins represented by the aforesaid general formula (1) are usable. Alternatively, use may be made of novolak type epoxy resins represented by the aforesaid general formula (2), i.e., reaction products of halohydrins such as epichlorohydrin with a novolak type phenol resin obtained by the condensation reaction of a phenol compound with aldehydes or ketones.

By way of example but not by way of limitation, the bisphenol type epoxy resins represented by general formula (1), for instance, include bisphenol A type epoxy resins, bisphenol F type epoxy resins, bisphenol AD type epoxy resins and biphenyl type epoxy resins. In these epoxy resins, a part of the epoxy group may have been modified by phenol compounds, amine compounds, carboxylic acids, isocyanate compounds, etc., provided that the features of the present invention are kept intact.

By way of example but not by way of limitation, the novolak type epoxy resins represented by general formula (2) include phenol novolak type epoxy resins, cresol novolak type epoxy resins, and tert-butyl phenol novolak type epoxy resins. In these epoxy resins, a part of the epoxy group may have been modified by phenol compounds, amine compounds, carboxylic acids, isocyanate compounds, etc., on condition that the features of the present invention are kept intact.

Then, the compound (A) having at least one epoxy group is allowed to react with the monocarboxylic acid compound (B).

The monocarboxylic acid (B) used herein, for instance, includes alkyl monocarboxylates, alkenyl monocarboxylates and aromatic monocarboxylic acids. To be more specific, use may be made of alkyl monocarboxylates such as formic acid, acetic acid, propionic acid, butyric acid, lauric acid, stearic acid, sebacic acid and oleic acid, alkenyl monocarboxylates such as acrylic acid, methacrylic acid and sorbic acid, and hydroxyl group-containing monocarboxylic acids such as glycolic acid and citric acid. Preferably but not exclusively, aromatic carboxylic acids represented by the following general formula (3) are used.

General Formula (3)

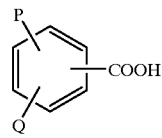

In general formula (3), P and Q, which may be different from or identical with each other, are each a hydrogen atom, a halogen atom, an alkyl group, an allyl group, and a hydroxyl group. For instance, benozic acid, hydroxybenzoic acid and toluic acid are usable.

Preferably, the monocarboxylic acid (B) should be used in an amount of 80 mol % or greater of the epoxy group in the compound (A) having at least one epoxy group. In other words, it is preferable that the carboxyl group is in the range of 0.8 to 1.5 moles per mole of epoxy group.

When the amount of the monocarboxylic acid used with respect to the epoxy group is less than 80 mol %, some problems arise. For instance, the resulting resin has an incrased softening point, and so is poor in adhesion and likely to gelate during adhesive agent production.

For the monocarboxylic acid according to the present invention, it is acceptable to use a mixture of the aforesaid monocarboxylic acids. Preferably in this case, however, the aromatic monocarboxylic acid represented by the aforesaid general formula (3) should account for 70 mol % or greater, preferably 80 mol % to 100 mol % of the monocarboxylic acids. When the content in the monocarboxylic acids used of the aromatic monocarboxylic acid represented by general formula (3) is below 70 mol %, some problems arise; for instance, too strong adhesion force results in poor water resistance. No particular limitation is imposed on the monocarboxylic acid compound (B) used herein with the proviso that the aforesaid requirements are satisfied.

For the reaction of the compound (A) having at least one epoxy group with the monocarboxylic acid compound (B), if required, a catalyst may be used. For the catalyst it is acceptable to use alkaline metal hydroxides, alkaline earth metal hydroxides, amines, imidazoles, quaternary ammonium salts, phosphines, phosphonium salts, etc. The amount of the catalyst used herein is in the range of 0.01 to 10 parts by weight per 100 parts by weight of carboxylic acids. To reduce the amount of metal ions in the reaction product, however, it is preferable to make use of amines, imidazoles, quaternary ammonium salts, phosphines and phosphonium salts.

The reaction temperature should be in the range of preferably 50 to 160° C. and more preferably 60 to 130° C., and the reaction time should be in the range of preferably 0.5 to 50 hours and more preferably 0.5 to 30 hours. For this reaction, organic solvents based on aromatic hydrocarbons, ketones, alcohols, esters, ethers, etc. may be used.

The alkali-soluble resin is synthesized by allowing the polycarboxylic acid and/or polycarboxylic anhydride to react with the hydroxyl group-containing resin obtained through such a process as mentioned above. The polycarboxylic acid and/or polycarboxylic anhydride used herein, for instance, include phthalic acid, maleic acid, succinic acid, trimellitic acid, pyromellitic acid, and anhydrides of these acids. The polycarboxylic acid and/or polycarboxylic anhydride may be used in such an amount as to provide an acid number of 50 to 200 mgKOH/g. If required, a catalyst may be used.

For the catalyst it is acceptable to use alkaline metal hydroxides, alkaline earth metal hydroxides, amines, imidazoles, quaternary ammonium salts, phosphines, phosphonium salts, etc. To reduce the amount of metal ions in the reaction product, however, it is preferable to make use of amines, imidazoles, quaternary ammonium salts, phosphines and phosphonium salts. The amount of the catalyst used herein is in the range of 0.01 to 10 parts by weight per 100 parts by weight of polycarboxylic acid and polycarboxylic acids.

The reaction temperature should be in the range of preferably 50 to 160° C. and more preferably 60 to 130° C., and the reaction time should be in the range of preferably 0.5 to 50 hours and more preferably 0.5 to 30 hours. For this reaction, organic solvents based on aromatic hydrocarbons, ketones, alcohols, esters, ethers, etc. may be used.

The thus obtained alkali-soluble resin is excellent in adhesion, adhesion strength, coatability, surface smoothness, water resistance, releasability and softening point controllability. Especially when this resin is used in the form of an alkali-soluble adhesive agent or the like, improved surface smoothness, water resistance, adhesive strength and releasability can be achieved in a well-balanced state. In other words, this adhesive agent can take a firm hold of the member to be polished at a polishing step, so that the member can be polished with high accuracy because of no or little misalignment. In addition, the excellent releasability of the adhesive agent makes it easy to release the polished member from a polishing turn table or the like.

An alkali-soluble resin (X) starting from the bisphenol type epoxy resin represented by general formula (1) is excellent in adhesion strength and smoothness in particular, while an alkali-soluble resin (Y) starting from the novolak type epoxy resin represented by general formula (2) is excellent in releasability and can provide a high-hardness coating film. Accordingly, a mixture of both the epoxy resins can provide an alkali-soluble adhesive agent which is different in properties from that obtained by sole use of the individual epoxy resins, and so can easily address a wide range of demands in a wide spectrum of applications.

To take full advantage of both the alkali-soluble resin (X) and the alkali-soluble resin (Y) when they are mixed together, the weight ratio of alkali-soluble resin (X)/alkali-soluble resin (Y) should be in the range of 90:10 to 50:50, and preferably 80:20 to 70:30, wherein an adhesive agent excellent in adhesion and scraper releasability can be obtained.

The content in the alkali-soluble resin of at least one metal selected from the group consisting of K, Ca, Mg, Al, Ni, Sn, Zn, Cu, Fe, Cr and Pb should preferably be 50 ppb or less. At this content, post-washing removal of metal ions can be so easily achieved that any deterioration in device performance can be avoided.

If necessary, the rosin resin may be used in combination with the alkali-soluble adhesive agent of the present invention. The rosin resin is added to the adhesive agent for the purposes of reducing the melting point drop of the adhesive agent and improving the ability of the adhesive resin to be released by a razor and washed with an alkali, the smoothness of the adhesive agent and the ability of the solvent to be removed (the ability of the adhesive agent to be dried), and for other purposes. The rosin resin, for instance, includes rosin, rosin ester, partial and hydrogenated rosin, and polymerized rosin as well as modified rosins comprising these rosins and dibasic acids such as maleic acid, all rosins having an acid number of 70 mgKOH/g or greater. At an acid number below 70 mgKOH/g, the solubility of the adhesive agent in alkalis becomes low. It is here noted that natural or synthetic shellac may be added to the rosin resin at a ratio of 40% by weight or less with respect thereto. The content of metal ions in an ordinary rosin resin are of the order of 2,000 ppb, and so it is preferable to reduce that content down to the order of a few hundred ppb, preferably 30 ppb by removing metal ions by an ordinary process such as distillation.

The rosin resin is used at a ratio of 0 part by weight to 40 parts by weight, and preferably 0 part by weight to 30 parts by weight, per 100 parts by weight of the alkali-soluble resin. A ratio exceeding 40 parts by weight is not preferable because the concentration of metal ions in the adhesive agent becomes high.

Preferably, the alkali-soluble adhesive agent of the present invention should contain at least one member selected from the group consisting of a plasticizer, a melt viscosity reducing agent and a surface active agent.

The plasticizer is added to the alkali-soluble adhesive agent for the purposes of controlling its softening point or spreadability. Usable for the plasticizer, for instance, are ethylamide toluenesulfonate, phthalic acid ester compounds, oxyacid ester compounds, aliphatic dibasic acid ester compounds and higher fatty acids, which may be used alone or in admixture. Particular preference is given to ethylamide toluenesulfonate. The plasticizer should be used in an amount of 0 part by weight to 35 parts by weight, and preferably 0 part by weight to 30 parts by weight, per 100 parts by weight of the alkali-soluble resin. By the addition of the plasticizer, it is possible to lower the softening point of the adhesive agent and improve the coating smoothness of the adhesive agent. However, it is noted that when the amount of the plasticizer exceeds 35 parts by weight, the releasability of the adhesive agent upon bonding becomes worse.

For the surface active agent used for the purpose of improving the smoothness of the coating film, for instance, use is made of silicone surfactants, polysiloxane fluorocarbon surfactants, fluorine surfactants and acetylene glycol surfactants, which may be used alone or in admixture. The surface active agent should account for 0% by weight to 2% by weight of the alkali-soluble adhesive agent. By the addition of the surface active agent, it is possible to improve the smoothness of the adhesive film upon coating or obtain an Rmax value of 0.05 $\mu$m or less. It is thus possible to achieve an alkali-soluble adhesive agent best suited for polishing silicon wafers in particular.

The melt viscosity reducing agent functions to lower the melt viscosity of the alkali-soluble adhesive agent without lowering its softening point, and enables a silicon wafer or the like to be stuck onto a turn table with improved accuracy. The melt viscosity reducing agent used herein, for instance, includes dicyclohexyl phthalate, stearic acid, lauric acid and palmitic acid having a melting point of 40° C. to 70° C., which is used in an amount of 0 to 35 parts by weight, and preferably 0 to 15 parts by weight, per 100 parts by weight of the alkali-soluble resin.

To prepare the alkali-soluble adhesive agent, the aforesaid alkali-soluble resin and various additives are dissolved in a ketone solvent such as acetone, methyl ethyl ketone or methyl isobutyl ketone, an alcoholic solvent such as ethanol, methanol or isopropanol, an aromatic hydrocarbon solvent such as benzene, toluene or xylene, an ester solvent such as ethyl acetate or butyl acetate, and an ether solvent such as ethylene glycol diethyl ether or ethylene glycol monopropyl ether, which may be used alone or in admixture. The ketone organic solvent is preferable.

The inventors have now found that the type of the solvent used has an influence on the smoothness of the coating film. By using a solvent composed mainly of a ketone solvent such as methyl ethyl ketone or methyl isobutyl ketone as the solvent, it is particularly possible to improve the smoothness of the coating film. Referring here to the smoothness of the coating film, it is possible to obtain an Ra value of 0.01 $\mu$m or less and an Rmax value of 0.11 $\mu$m or less. It is thus possible to achieve an alkali-soluble adhesive agent advantageously used for silicon wafer polishing. It is here noted that Ra is the center line-average roughness of a roughness curve and Rmax is the maximum height of a roughness curve.

The concentration of the resin in the alkali-soluble adhesive agent should preferably be in the range of 10 to 50% by weight. When the resin concentration is below 10% by weight, it is difficult to form an adhesive layer of sufficient adhesion force. At a resin concentration exceeding 50% by weight, on the other hand, some problems arise; for instance, it is difficult to obtain a uniform adhesive layer due to too strong adhesive force.

The content in the alkali-soluble resin of at least one metal selected from the group consisting of K, Ca, Mg, Al, Ni, Sn, Zn, Cu, Fe, Cr and Pb should preferably be 50 ppb or less, and more preferably 20 ppb or less. At this content, it is possible to avoid any deterioration in device performance due to the residence of impure metals upon silicon wafer polishing.

The alkali-soluble adhesive agent may be used in the form of a liquid adhesive agent dissolved in the ketone organic solvent or a solid adhesive agent free from any ketone organic solvent.

When used for the polishing of a lens substrate, glass substrate or the like, the alkali-soluble adhesive agent of the present invention is coated on the back side of the substrate to be not polished, followed by drying. Then, the substrate is compressed onto a polishing turn table while the adhesive agent is heated to a molten state. After the completion of polishing, the substrate is released from the turn table by means of a scraper, and the adhesive deposits are dissolved and washed out by a washing agent. Such a washing agent, for instance, includes an aqueous solution of ammonium hydroxide, an aqueous solution of organic alkalis such as an aqueous solution of amines, e.g., an aqueous solution of alkanol amine, and an aqueous solution of inorganic alkalis such as an aqueous solution of sodium hydroxide, sodium carbonate or silicates.

Set out below are examples of synthesis of the alkali-soluble resin, wherein "parts" are given by weight.

Synthesis Example 1

Seven hundred and sixty (760) parts of bisphenol A type liquid epoxy resin (YD-128 mad by Toto Kasei Co., Ltd. and having an epoxy equivalent of 187 g/eq), 439.6 parts of benzoic acid recrystallized from pure water having an electrical conductivity of 17×10$^{-2}$ M$\Omega$·m and then dried, 24 parts of acetic acid rectified at a temperature of 40° C. and a degree of vacuum of 66.7 KPa, and 50 parts of methyl ethyl ketone were charged in a 2-liter separable flask having a stirrer, a condenser and a nitrogen purger, and heated to 100° C. under a nitrogen stream. Triphenylphosphine (2.4 parts) dissolved in 10 parts of methyl ethyl ketone was put in the separable flask over one hour while care was taken of the generation of heat. Thereafter, these reactants were allowed to react with one another at 110 to 120° C. until an acid number of 2 mgKOH/g or less was obtained. The reaction time was 6 hours.

Then, 62.5 parts of trimellitic anhydride recrystallized from methyl ethyl ketone and then dried, and 34.7 parts of tetrahydrophthalic anhydride recrystallized from methyl ethyl ketone and then dried were put in the flask for a 3-hour reaction at 115 to 120° C. After the completion of the reaction, the reaction product was removed from the flask, cooled and solidified to obtain the end alkali-soluble resin. The physical properties of the obtained resin are shown in Table 1 given later.

Synthesis Example 2

Seven hundred and sixty (760) parts of bisphenol A type liquid epoxy resin (YD-128 mad by Toto Kasei Co., Ltd. and having an epoxy equivalent of 187 g/eq), 487.5 parts of benzoic acid recrystallized from pure water having an electrical conductivity of $17 \times 10^{-2}$ MΩ·m and then dried, and 55 parts of methyl ethyl ketone were charged in a 2-liter separable flask having a stirrer, a condenser and a nitrogen purger, and heated to 100° C. under a nitrogen stream. Triphenylphosphine (2.4 parts) dissolved in 10 parts of methyl ethyl ketone was put in the separable flask over one hour while care was taken of the generation of heat. Thereafter, these reactants were allowed to react with one another at 110 to 120° C. until an acid number of 2 mgKOH/g or less was obtained. The reaction time was 8 hours.

Then, 381.1 parts of tetrahydrophthalic anhydride recrystallized from methyl ethyl ketone and then dried, and 69.3 parts of maleic anhydride recrystallized from methyl ethyl ketone and then dried were put in the flask for a 4-hour reaction at 115 to 120° C. After the completion of the reaction, the reaction product was removed from the flask, cooled and solidified to obtain the end alkali-soluble resin. The physical properties of the obtained resin are shown in Table 1 given later.

Synthesis Example 3

Seven hundred and sixty (760) parts of phenol novolak type epoxy resin (YDPN-638 mad by Toto Kasei Co., Ltd. and having an epoxy equivalent of 179 g/eq), 362.6 parts of benzoic acid recrystallized from pure water having an electrical conductivity of $17 \times 10^{-2}$ MΩ·m and then dried, 76.4 parts of acetic acid rectified at a temperature of 40° C. and a degree of vacuum of 66.7 KPa, and 60 parts of methyl ethyl ketone were charged in a 2-liter separable flask having a stirrer, a condenser and a nitrogen purger, and heated to 100° C. under a nitrogen stream. Triphenylphosphine (2.4 parts) dissolved in 10 parts of methyl ethyl ketone was put in the separable flask over one hour while care was taken of the generation of heat. Thereafter, these reactants were allowed to react with one another at 110 to 120° C. until an acid number of 3 mgKOH/g or less was obtained. The reaction time was 10 hours.

Then, 90.1 parts of trimellitic anhydride recrystallized from methyl ethyl ketone and then dried, and 220.3 parts of maleic anhydride recrystallized from methyl ethyl ketone and then dried were put in the flask for a 4-hour reaction at 110 to 115° C. After the completion of the reaction, the reaction product was removed from the flask, cooled and solidified to obtain the end alkali-soluble resin. The physical properties of the obtained resin are shown in Table 1 given later.

Set out below are examples of synthesis of comparative alkali-soluble resin.

Comparative Synthesis Example 1

Seven hundred and sixty (760) parts of bisphenol A type liquid epoxy resin (YD-128 mad by Toto Kasei Co., Ltd. and having an epoxy equivalent of 187 g/eq) were charged in a 2-liter separable flask having a stirrer, a condenser and a nitrogen purger, and heated to 100° C. under a nitrogen stream. Triphenylphosphine(2.4 parts) dissolved in 241 parts of acetic acid rectified at a temperature of 40° C. and a degree of vacuum of 66.7 KPa was put in the separable flask over one hour while care was taken of the generation of heat. Thereafter, these reactants were allowed to react with one another at 120 to 130° C. until an acid number of 1 mgKOH/g or less was obtained. The reaction time was 4 hours.

Then, 309 parts of trimellitic anhydride recrystallized from methyl ethyl ketone and then dried were put in the flask for a 3-hour reaction at 115 to 120° C. After the completion of the reaction, the reaction product was removed from the flask, cooled and solidified to obtain the end alkali-soluble resin. The physical properties of the obtained resin are shown in Table 1 given later.

Comparative Synthesis Example 2

Seven hundred and sixty (760) parts of bisphenol A type liquid epoxy resin (YD-128 mad by Toto Kasei Co., Ltd. and having an epoxy equivalent of 187 g/eq), and 33.5 parts of bisphenol A were charged in a 2-liter separable flask having a stirrer, a condenser and a nitrogen purger, and heated to 120° C. under a nitrogen stream to dissolve bisphenol A therein. Further, triphenylphosphine (0.1 part) was put in the flask for a reaction at 150 to 160 until an epoxy equivalent of 210 g/eq was obtained. The reaction time was 1.5 hours.

Then, 277.4 parts of benzoic acid recrystallized from pure water having an electrical conductivity of $17 \times 10^{-2}$ MΩ·m and then dried, and 89.5 parts of acetic acid rectified at a temperature of 40° C. and a degree of vacuum of 66.7 KPa were charged in the flask. Upon the temperature of the content reaching 120° C., triphenylphosphine (2.4 parts) dissolved in 60 parts of methyl ethyl ketone was put in the separable flask over one hour while care was taken of the generation of heat. Thereafter, these reactants were allowed to react with one another at 110 to 120° C. until an acid number of 3 mgKOH/g or less was obtained. The reaction time was 5 hours.

Then, 179 parts of trimellitic anhydride recrystallized from methyl ethyl ketone and then dried were put in the flask for a 3-hour reaction at 115 to 120° C. After the completion of the reaction, the reaction product was removed from the flask, cooled and solidified to obtain the end alkali-soluble resin. The physical properties of the obtained resin are shown in Table 1 given later.

Comparative Synthesis Example 3

Seven hundred and sixty (760) parts of bisphenol A type liquid epoxy resin (YD-128 mad by Toto Kasei Co., Ltd. and having an epoxy equivalent of 187 g/eq), 297.5 parts of benzoic acid recrystallized from pure water having an electrical conductivity of $17 \times 10^{-2}$ MΩ·m and then dried, and 36.6 parts of acetic acid rectified at a temperature of 40° C. and a degree of vacuum of 66.7 KPa were charged in a 2-liter separable flask having a stirrer, a condenser and a nitrogen purger. Upon the temperature of the content reaching 120° C., triphenylphosphine (2.4 parts) dissolved in 60 parts of methyl ethyl ketone was put in the separable flask over one hour while care was taken of the generation of heat. Thereafter, these reactants were allowed to react with one another at 110 to 120° C. until an acid number of 3 mgKOH/g or less was obtained. The reaction time was 3 hours.

Then, 179 parts of trimellitic anhydride recrystallized from methyl ethyl ketone and then dried were charged in the flask for a further reaction at 115 to 120° C. However, the reaction was discontinued thanks to gelation.

TABLE 1

| Alkali-Soluble Resin | (A) mol % | (B) mol % | Softening Point, ° C. | Acid Number mgKOH/g |
|---|---|---|---|---|
| Synthesis Ex. 1 | 98.5 | 90.0 | 83.0 | 110 |
| Ex. 2 | 99.0 | 100 | 62.0 | 110 |
| Ex. 3 | 100 | 70 | 85 | 115 |
| Comp. Example 1 | 98.5 | 0 | 80 | 100 |
| Comp. Example 2 | 100 | 50 | 85 | 100 |
| Comp. Example 3 | 75 | 80 | gel | gel |

In Table 1, (A) is the amount of the monocarboxylic acid used with respect to the epoxy group and (B) is the amount of the aromatic monocarboxylic acid in the monocarboxylic acid used. The softening point and acid number are the characteristic values of the resin solidified upon removal by distillation of the solvent component at 150° C. under a vacuum of $6.7 \times 10^2$ Pa for 30 minutes. The softening point was measured by a ball-and-ring method.

An example where the alkali-soluble resin of the present invention is in the form of a mixture is given as synthesis example 4.

Synthesis Example 4

Eight (8) parts of the alkali-soluble resin obtained in synthesis example 1 was mixed with 2 parts of the alkali-soluble resin obtained in synthesis example 3 to obtain an alkali-soluble adhesive agent according to the present invention.

More specifically but not exclusively, the present invention is now explained with reference to the following examples wherein "parts" are given by weight.

EXAMPLE 1

The alkali-soluble resin synthesized in synthesis example 1 was dissolved in a solvent having the composition shown in Table 2, thereby preparing a resin solution having a solid concentration of 30% by weight.

Using a spinner (1H-DX-2 made by Mikasa Co., Ltd.), the obtained resin solution was coated on a 4-inch glass wafer with a droplet amount of 2 cc at two stages, say, 500 rpm×2 seconds and 3,000 rpm×3 seconds, and then dried at 100° C. for 1 minute.

Using a surface roughness meter (Surfcomb 574A made by Tokyo Seimitsu Co., Ltd.), the obtained coating film was measured over a 20 mm distance perpendicular to a point 4 cm away from the wafer center to the wafer center point to find the center line-average roughness (Ra) of a roughness curve and the maximum height (Rmax) of the roughness curve. The results are again shown in Table 2.

TABLE 2

| MEK (wt %) | 100 | 68 | — | 30 |
|---|---|---|---|---|
| IPA (wt %) | — | 32 | 32 | 40 |
| MIBK (wt %) | — | — | 68 | 30 |
| Ra ($\mu$m) | 0.01 | 0.01 | 0.01 | 0.01 |
| Rmax ($\mu$m) | 0.10 | 0.09 | 0.10 | 0.11 |
| Smoothness | VG | VG | VG | VG |

In Table 2, MEK, IPA and MIBK are the abbreviations for methyl ethyl ketone, isopropanol and methyl isobutyl ketone, respectively. Regarding smoothness estimated in terms of Ra and Rmax, VG represents "very good".

For the purpose of comparison, a solvent consisting of 50 wt % of cyclohexane and 50 wt % of ethyl acetate was used. The smoothness of the coating film was inferior as can be seen from Ra of 0.08 $\mu$m and Rmax of 1.19 $\mu$m.

This result teaches that the ketone solvent is effective for the smoothness of the coating surface.

Then, prepared was a resin solution composed of 46.7% by weight of the alkali-soluble resin synthesized in synthesis example 1, 32.5% by weight of methyl ethyl ketone (SC-2-Butanone made by Wako Junyaku Kogyo Co., Ltd. for electronic industry purposes) and 20.8% by weight of iso-propanol (SC-2-Propanol made by Wako Junyaku Kogyo Co., Ltd. for electronic industry purposes).

As a result of measurement of the metal contents of this resin solution using an ICP mass spectrometer (outsourced to the Sumika Bunseki Center), the iron content was 12 ppb, the Al content 1 ppb, the Ni content 1 ppb, the Mg content 1 ppb, the Ca content 9 ppb, the K content 5 ppb, the Zn content 6 ppb, the Cu content 1 ppb, the Cr content 2 ppb, the Pb content 1 ppb or less and the Sn content 1 ppb or less. It was thus found that the resin solution can provide an adhesive agent suitable for the polishing of wafers in integrated circuits, etc.

Besides, 5% by weight of dicyclohexyl phthalate or DCHP having a melting point 61° C. was added to the alkali-soluble resin synthesized in synthesis example 1, which was then heated to 120° C. for milling.

The softening point of the obtained adhesive agent was measured by an automatic softening point measuring device (ASP-MG, ASP-MG4 made by Meitech Co., Ltd.) according to a ball-and-ring method (JIS K2207). The results are given in the following Table 3.

The melt viscosity of the adhesive agent was also measured at such varying temperatures as shown in Table 3, using a Viscoblock VTB-400 (Brookfield type viscometer made by Tokimech Co., Ltd.) under the conditions of HM rotor No. 3 and 6 rpm. The results are shown in Table 3.

TABLE 3

| Additive Softening Point (° C.) Melt Viscosity | Not Used 72.8 | DCHP 5 wt % 72.2 | Stearic Acid 5 wt % 73.1 |
|---|---|---|---|
| 110° C. | 10000< | 4500 | 5100 |
| 120° C. | 3850 | 1920 | 2200 |
| 130° C. | 1850 | 800 | 950 |
| 140° C. | 900 | 400 | 450 |
| 140° C. | 900 | 400 | 450 |

The unit of melt viscosity is mpa·s.

From these results, it is found that by the addition of such additives as DCHP and stearic acid, it is possible to lower the melt viscosity without any lowering of the softening point of the solid matter.

EXAMPLE 2

The alkali-soluble resin synthesized in synthesis example 1 was dissolved in the solvent with the composition shown in Table 4 given later. The surface active agents shown in Table 4 were added to the resulting solution at the ratios (% by weight) shown in Table 4, thereby preparing a resin solution having a solid concentration of 30% by weight. The resin solution was found to have a viscosity of 2.6 mPa·s (25° C.).

Using a spinner (1H-DX-2 made by Mikasa Co., Ltd.), the obtained resin solution was coated on a 4-inch glass wafer with a droplet amount of 2 cc at two stages, say, 500 rpm×2 seconds and 3,000 rpm×3 seconds, and then dried at 100° C. for 1 minute.

Using a surface roughness meter (Surfcomb 574A made by Tokyo Seimitsu Co., Ltd.), the obtained coating film was measured over a 20 mm distance with respect to a point 4 cm away from the wafer center to find the center line-average roughness (Ra) of a roughness curve and the maximum height (Rmax) of the roughness curve. The results are again shown in Table 4.

TABLE 4

| MEK (wt %) | 69 | 69 | 68 | 69 | 68 |
|---|---|---|---|---|---|
| IPA (wt %) | 32 | 32 | 32 | 32 | 32 |
| SN-EX5165 | 0.55 | 0.90 | — | — | — |
| EFKA34 | — | — | 0.50 | — | — |
| FC-431 | — | — | — | 0.1 | — |
| Surfinol 61 | — | — | — | — | 0.5 |
| Ra ($\mu$m) | 0.00 | 0.00 | 0.00 | 0.01 | 0.01 |
| Rmax ($\mu$m) | 0.04 | 0.04 | 0.05 | 0.05 | 0.15 |
| Smoothness | VG | VG | VG | VG | F |

In Table 4, MEK and IPA are the abbreviations for methyl ethyl ketone and isopropanol, respectively. SN-EX5165 is a silicone surface active agent made by Sannopuko Co., Ltd., EFKA34 is a polysiloxane fluorocarbon surface active agent made by EFKA Chemicals Co., Ltd., FC431 is a fluorine surface active agent made by 3M Co., Ltd., and Surfinol 61 is an acetylene glycol surface active agent made by Air Products Japan Co., Ltd. Regarding smoothness estimated in terms of Ra and Rmax, VG and F represent "very good" and "normal", respectively.

From these results, it is found that smoother coating surfaces are obtainable by the addition of effective surface active agents.

EXAMPLE 3

Checking of Releasability

The alkali-soluble resins obtained in synthesis examples 1 to 4 and comparative synthesis examples 1 and 2 were each dissolved in methyl ethyl ketone to prepare a resin solution having a solid concentration of 30% by weight.

Using a spinner (1H-DX-2 made by Mikasa Co., Ltd.), each of the obtained resin solutions was coated on a 4-inch glass wafer with a droplet amount of 2 cc at two stages, say, 500 rpm×2 seconds and 3,000 rpm×3 seconds, and then dried on a hot plate (ULTRA HOTPLATE HI-400 made by Iuchi Seieido Co., Ltd.) at 100° C. for 1 minute.

Then, a silicon wafer with the resin solution coated thereon was stuck onto a ceramic turn table preheated to 120° C. Afterwards, the turn table was cooled down to room temperature at which the sharp edge of a scraper was put between the ceramic turn table and the wafer to release the wafer to the ceramic turn table. To what degree the wafer was released from the turn table is shown in Table 5.

Tensile Shear Adhesion Strength

Next, a stainless test piece of 15 mm in width, 100 mm in length and 1.5 mm in thickness was heated to 100° C. Each of the alkali-soluble resins in a molten state, obtained in synthesis examples 1 to 4 and comparative synthesis examples 1 and 2, was coated on the 10 mm long portions of the 15 mm long tips of two such test pieces to laminate them together. The test pieces were spontaneously cooled down to room temperature. The test pieces were immersed in a constant temperature water bath at a water temperature of 25° C. for 20 minutes, and thereafter measured for tensile shear adhesion strength (MPa), using a tensile tester (Strograph R-1 made by Toyo Seiki Seisakusho Co., Ltd.) at a speed of 25 mm per minute. The obtained measurements are shown in Table 5.

Checking of Ability to be Washed

A solution in methyl ethyl ketone of each of the alkali-soluble resins obtained in synthesis examples 1 to 4 and comparative synthesis examples 1 and 2 was coated and dried on a glass plate in such a way that a resin thickness of 2 $\mu$m was obtained after solvent removal by drying. The glass plate was then immersed in a 0.1% by weight aqueous solution of tetramethylammonium hydroxide (TMAH) at 25° C. for 10 seconds to test for the degree of the ability to be washed. The results are shown in Table 5.

Checking of Water Resistance

A solution in methyl ethyl ketone of each of the alkali-soluble resins obtained in synthesis examples 1 to 4 and comparative synthesis examples 1 and 2 was coated and dried on a glass plate in such a way that a resin thickness of 2 $\mu$m was obtained after solvent removal by drying. The glass plate was then immersed in water at 25° C. for 10 seconds to test for the water resistance of the coating film. The results are shown in Table 5.

TABLE 5

| Alkali-Soluble Resin | Tensile Shear Adhesion Strength | Releas-ability | Ability To Be Washed | Water Resistance |
|---|---|---|---|---|
| Synthesis Ex. 1 | 1.8 MPa | VG | VG | VG |
| Synthesis Ex. 2 | 2.2 MPa | VG | VG | VG |
| Synthesis Ex. 3 | 2.4 MPa | F | G | G |
| Synthesis Ex. 4 | 2.0 MPa | VG | VG | VG |
| Comp. Synthesis Ex. 1 | 6.2 MPa | P | VG | P |
| Comp. Synthesis Ex. 2 | 5.8 MPa | P | VG | P |

VG, G, F and P represent "very good", "good", "normal" and "poor", respectively.

From these results, it is found that by specifying the ratio between the amount of the monocarboxylic acid used with respect to the epoxy group and the amount of the aromatic monocarboxylic acid in the monocarboxylic acid used, it is possible to achieve an alkali-soluble resin having improved water resistance, adhesion and releasability in a well-balanced state.

EXAMPLE 4

Fourteen (14) parts by weight of ethylamide toluene-sulfonate (Topsizer No. 3 made by Fuji Amidochemical Co., Ltd.) were mixed with a mixture of 300 parts by weight of a solution obtained by diluting the alkali-soluble resin synthesized in synthesis example 1 with methyl ethyl ketone in such a way as to provide a solid content of 36% by weight and 100 parts by weight of a solution obtained by diluting polymerized rosin (Foral AXE made by Hercules Co., Ltd. and having an acid number of 140 mgKOH/g) with methyl ethyl ketone in such a way as to provide a solid content of 38% by weight. Further, 21 parts by weight of methyl ethyl ketone were added to the resulting mixture to prepare a solution form of adhesive agent having a solid content of 40% by weight.

For the aforesaid polymerized rosin, a rosin product having a sodium ion content of 890 ppb, an aluminum ion content of 440 ppb, a zinc ion content of 460 ppb, an iron ion content of 610 ppb, a nickel ion content of 7 ppb, a copper ion content of 3 ppb and a chromium ion content of 19 ppb was used. However, these ion contents had been reduced by metal ion removal by distillation to 2 ppb for sodium ions, 20 ppb for aluminum ions, 8 ppb for zinc ions, 7 ppb for iron ions, 0 ppb for nickel ions, 0 ppb for copper ions and 0 ppb for chromium ions.

The obtained liquid adhesive agent was estimated by the following methods in terms of smoothness upon coating, adhesion force, ability to be washed and softening point.

Estimation of Smoothness Upon Coating

The liquid adhesive agent was coated on a glass wafer under the following conditions, and then heated and dried in an electric oven under the conditions of 80° C.×5 minutes.

Coating Condition

Device: Spin Coater 1H 360 Type made by Mikasa Co., Ltd.

Conditions: Initial 1,000 rpm/2 sec. to full 3,000 rpm/10 sec.

Coating Thickness: 4±0.5 μm

After drying, the flatness of the coating surface was measured by a probe type surface roughness meter (Surfcomb 574A made by Tokyo Seimitsu Co., Ltd.) to find its smoothness upon coating.

Estimtion of Adhesion Force

The liquid adhesive agent was coated on a stainless plate under the same coating conditions as mentioned above, and then heated and dried in the same manner as mentioned above. Then, the stainless plate was combined with another stainless plate, after which they were laminated together under the thermal lamination conditions of 120° C. and 0.01 MPa. The tensile shear strength of the laminated plates was measured by a Strograph meter (R-1 made by Toyo Seiki Co., Ltd.) to find adhesion force (MPa).

Estimation of Ability to be Washed

Using a washing machine (EE-MO-02N made by Olympus Optical Co., Ltd.) with a 4% aqueous solution of ammonium carbonate, the adhesive agent deposited onto the stainless plate released for the aforesaid estimation of adhesion force was estimated in terms of the ability to be washed at 30° C. for 30 minutes.

Estimation of Softening Point

The liquid adhesive agent was placed in a vacuum dryer preset to 80° C. to volatilize off the solvent to obtain a solid adhesive agent, the softening point (° C.) of which was in turn found by a ball-and-ring method.

EXAMPLE 5

The liquid adhesive agent obtained in example 4 was placed in a vacuum dryer preset to 80° C. to volatilze off the solvent to obtain a solid adhesive agent. This adhesive agent was then used as a temporal adhesive agent for the cutting and polishing or slicing of a rock crystal ingot.

The obtained solid adhesive agent was estimated by the following methods in terms of smoothness upon coating, adhesion force and ability to be washed. It is here noted that the softening point of the adhesive agent was estimated as in example 4.

After molten at 130° C., the solid adhesive agent was coated by a bar coater on a supporting substrate at a thickness of 4±0.5 μm while the substrate was heated on a hot plate preset to 130° C. Then, the rock crystal ingot was compressed onto the coating film, followed by cooling and fixation.

Whether or not the instant adhesive agent was suitable for temporal bonding of a quartz oscillator part was estimated.

Estimation of Adhesion Force

After molten at 120° C., the solid adhesive agent was coated on a stainless plate under the same conditions as mentioned above, after which another stainless plate was laminated on the coating surface of the stainless plate. The stainless plates were laminated together under the thermo-compression conditions of 120° C. and 0.01 MPa. The tensile shear strength of the laminated plates was measured by Strograph meter (R-1 made by Toyo Deiki Co., Ltd.) to find adhesion force (MPa).

Estimation of Ability to be Washed

Using a washing machine (EE-MO-02N made by Olympus Optical Co., Ltd.) with a 4% aqueous solution of ammonium carbonate, the adhesive agent deposited onto the stainless plate released for the aforesaid estimation of adhesion force was estimated in terms of the ability to be washed at 30° C. for 30 minutes.

TABLE 6

|  | Surface Smoothness | Adhesion Force | Ability To Be Washed | Softening Point |
| --- | --- | --- | --- | --- |
| Ex. 4 | G | 3.0 MPa | G | 8.0° C. |
| Ex. 5 | — | 3.0 MPa | G | — |

Regarding the results of estimation of the smoothness upon coating and the ability to be washed, VG, G, F and P represent "very good", "good", "normal" and "poor", respectively.

It is thus found that by the addition of the rosin resin to the alkali-soluble resin, the smoothness upon coating and the ability to be washed can be improved. The adhesion force and softening point, too, can be improved.

What we claim is:

1. An alkali-soluble adhesive agent characterized by comprising an alkali-soluble resin that is a reaction product (C) obtained by allowing a polycarboxylic acid and/or a polycarboxylic anhydride having two or more carboxyl groups to react with a reaction product of a compound (A) having at least one epoxy group with a monocarboxylic acid compound (B).

2. An alkali-soluble adhesive agent characterized by comprising an alkali-soluble resin that is a reaction product (C) obtained by allowing a polycarboxylic acid and/or a polycarboxylic anhydride having two or more carboxyl groups to react with a reaction product of a compound (A) having at least one epoxy group with a monocarboxylic acid compound (B), and a ketone organic solvent.

3. An alkali-soluble adhesive agent characterized by comprising an alkali-soluble resin that is a reaction product (C) obtained by allowing a polycarboxylic acid and/or a polycarboxylic anhydride having two or more carboxyl groups to react with a reaction product of a compound (A) having at least one epoxy group with a monocarboxylic acid compound (B), and a ketone organic solvent, optionally with at least one member selected from the group consisting of a melt viscosity reducing agent, a surface active agent and a plasticizer.

4. The alkali-soluble adhesive agent according to any one of claims 1 to 3, characterized in that the alkali-soluble resin has a softening point of 40 to 130° C. and an acid number of 50 to 200 mgKOH/g.

5. The alkali-soluble adhesive agent according to any one of claims 1 to 3, characterized in that the compound (A) having at least one epoxy group is an epoxy resin represented by the following general formula (1) and/or (2):

General Formula (1)

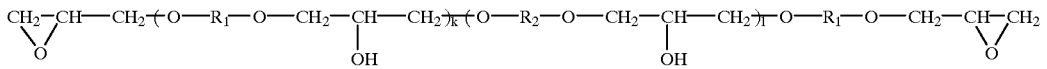

wherein $-O-R_1-O-$ and $-O-R_2-O-$ are each a divalent phenol residue and k is 1 or an integer equal to or greater than 0, and/or General Formula (2)

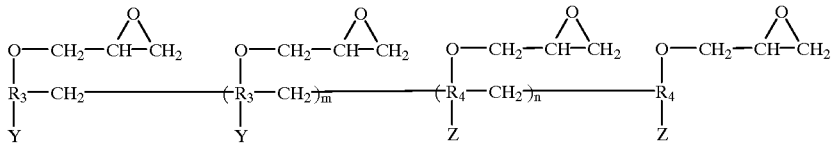

wherein $-O-R_3-$ and $-O-R_4-$, which may be different from or identical with each other, are each a monovalent phenol residue, Y and Z, which may be different from or identical with each other, are each a hydrogen atom, a halogen atom, a glycidyl ether group, an alkyl group, an allyl group or an aralkyl group, provided that said alkyl group, allyl group and aralkyl group may have a glycidyl substituent, and m and n are each an integer equal to or greater than 0.

6. The alkali-soluble adhesive agent according to claim 5, characterized in that the weight mixing ratio of the epoxy resin represented by general formula (1) and the epoxy resin represented by general formula (2) is from 90:10 to 50:50.

7. The alkali-soluble adhesive agent according to any one of claims 1 to 3, characterized in that 0 to 40 parts by weight of a rosin resin having an acid number of 70 mgKOH/g or greater are further added to 100 parts by weight of the alkali-soluble resin.

8. The alkali-soluble adhesive agent according to any one of claims 1 to 3, characterized by containing one metal selected from the group consisting of K, Ca, Mg, Al, Ni, Sn, Zn, Cu, Fe, Cr and Pb at a content of 50 ppb or less.

* * * * *